US007034907B2

(12) United States Patent
West et al.

(10) Patent No.: US 7,034,907 B2
(45) Date of Patent: Apr. 25, 2006

(54) STRESSED LIQUID CRYSTALS AS AN ULTRA-FAST LIGHT MODULATING MATERIAL CONSISTING OF UNIDIRECTIONALLY ORIENTED LIQUID CRYSTAL MICRO-DOMAINS SEPARATED BY POLYMER CHAINS

(75) Inventors: John L. West, Munroe Falls, OH (US); Anatoliy V. Glushchenko, Kent, OH (US)

(73) Assignee: Kent State University, Kent, OH (US)

( * ) Notice: Subject to any disclaimer, the term of this patent is extended or adjusted under 35 U.S.C. 154(b) by 30 days.

(21) Appl. No.: 10/365,322

(22) Filed: Feb. 11, 2003

(65) Prior Publication Data

US 2004/0155997 A1 Aug. 12, 2004

(51) Int. Cl.
*G02F 1/1334* (2006.01)
*G02F 1/139* (2006.01)

(52) U.S. Cl. ............................ 349/86; 349/94; 349/193

(58) Field of Classification Search .................. 349/86, 349/87, 88, 89, 90, 92, 93, 94, 167, 171, 349/193, 191, 196, 117, 201, 202, 96
See application file for complete search history.

(56) References Cited

U.S. PATENT DOCUMENTS

| 4,685,771 A | 8/1987 | West et al. | 350/347 V |
| 4,890,902 A | 1/1990 | Doane et al. | 350/347 V |
| 4,994,204 A | 2/1991 | Doane et al. | 252/299.01 |
| 5,812,227 A | 9/1998 | Toshida et al. | 349/88 |
| 6,104,448 A * | 8/2000 | Doane et al. | 349/12 |
| 6,618,114 B1 * | 9/2003 | Freeman | 349/187 |

FOREIGN PATENT DOCUMENTS

JP 04-097225 * 3/1992

OTHER PUBLICATIONS

Wu et al., *Molecular Cryst. Liq. Cryst.—High Speed Nematic Liquid Crystal Modulators*, 1991, vol. 207, pp. 1-15.

* cited by examiner

*Primary Examiner*—Robert Kim
*Assistant Examiner*—Tai Duong
(74) *Attorney, Agent, or Firm*—Hahn Loeser & Parks, LLP

(57) ABSTRACT

A new light modulating material using unidirectionally oriented micro-domains of liquid crystal separated by polymer chains is provided. Liquid crystal/polymer films are produced by a one step production process involving a photopolymerizable monomer mixed with a liquid crystal then exposed to UV light. In one embodiment, force deformations are applied to the films resulting in diffraction efficiencies of more than 95%. In another embodiment, applying a planar force to a thick film that produced a 2 μm shift of phase retardation in several hundred microseconds when an appropriate field is applied. Use of this invention provides fast response time and a low required driving voltage. The new cell can be used as spatial light modulators for manufacturing information displays, electro-optical devices, telecommunications system, optical data processing, adaptive optics applications, color projection displays and switchable micro-lens optics.

17 Claims, 6 Drawing Sheets

STRESSED LIQUID CRYSTALS AS AN ULTRA-FAST LIGHT MODULATING MATERIAL CONSISTING OF UNIDIRECTIONALLY ORIENTED LIQUID CRYSTAL MICRO-DOMAINS SEPARATED BY POLYMER CHAINS

GOVERNMENT RIGHTS

The United States Government has a paid-up license in this invention and may have the right in limited circumstances to require the patent owner to license others on reasonable terms as provided for by the terms of Grant No. 444226, awarded by the Defense Advanced Research Projects Agency (DARPA).

FIELD OF INVENTION

The present invention relates generally to liquid crystal technology, and more specifically to a new ultra-fast light modulating material consisting of unidirectionally oriented micro-domains of liquid crystal separated by polymer chains.

BACKGROUND

Light modulators operating at fast frame rates (kilohertz or faster) are in great demand for optical data processing and adaptive optics applications as well as for color projection displays using a time sequential color scheme. Much progress has been made in the last thirty years in developing optical switches or modulators, but current devices are unsatisfactory for many applications. For instance, the majority of active fiber-optic devices used in present day systems, are based on an electromechanical modulator. In one type, the optical fibers are positioned end to end and mechanically moved in or out of line. In another type, mirrors are rotated to direct beams into or away from a receiving fiber. This can be accomplished mechanically or with piezoelectric or electrostatic drivers. These mechanical devices intrinsically lack speed and long term reliability.

To solve these problems, fast (less than one microsecond) optical switches using a solid electro-optic crystal in which birefringence can be induced by application of an electric field to the crystal have been developed. Operation is based on rotating the plane of polarization of light with respect to the orientation of an analyzer that blocks or transmits light depending on the polarization direction. The basic arrangement works efficiently with polarized incoming light with a particular orientation. However, randomly polarized light suffers a loss. This is overcome by using additional elements that split incoming light into two orthogonal polarizations, passively rotating one to match the other, and combining the two into a single beam fed to the basic modulator. However, the suggested electro-optic crystals, require voltages of a kV or more for operation. Accordingly, such devices are not well suited for telecommunication devices.

Additional modulators have been constructed using a tapered plate, a Faraday rotator or solid electro-optic crystal, and a second tapered plate. The Faraday rotator is controlled by varying the current in an external coil, which varies a magnetic field. But, the suggested electro-optic crystals require inefficient kilovolt drive voltages. Also, electrode design also effects polarization dependence and modulation efficiency.

Liquid crystals are an interesting medium for electro-optical effects due to their large optical birefringence and dielectric anisotropy. It is only natural that investigators would consider forming electrically controllable birefringent plates made of liquid crystalline materials. And it is known to utilize a variety of modes of a liquid crystal cell such as $\pi$-cells, and optically controllable birefringent (OCB) cells. Unfortunately, such liquid crystal based light modulators have relatively slow response times and cannot be operated typically faster than video rates (30–80Hz). The transient nematic effect operating in the reflective mode has been proposed to achieve fast response times in a liquid crystal cell. Fast speed is achieved by only utilizing the surface layer of a nematic cell. The bulk of the cell remains unchanged. Utilizing only the surface produces only a low phase retardation.

To overcome the above limitations, liquid crystal devices containing polymer have been developed over the past decades. These devices can be divided in two subsystems: polymer dispersed liquid crystals (PDLC); and polymer stabilized liquid crystals (PSLC). In a PDLC device, a liquid crystal exists in the form of micro-sized droplets, which are dispersed in a polymer matrix. The concentration of the polymer is comparable to that of the liquid crystal. The polymer forms a continuous medium while the liquid crystal droplets are isolated from one another. These materials have been successfully used in displays, light shutters and switchable windows. Particularly interesting was an idea to use stretched PDLC films for producing electrically controlled polarizers. The operating principle of a PDLC polarizer is based on anisotropic light scattering of PDLC films resulting from unidirectionally oriented nematic droplets. The liquid crystal domains imbedded in the confined geometry of a polymer matrix are currently among the fastest known switching devices. Unfortunately, such systems have low filling factors and liquid crystal domain size. Moreover, these devices are only known to provide light amplitude modulation, but not light phase modulation, which is critical for beam steering applications. And stretched PDLC devices, even at high shearing deformations, scatter light.

In a PSLC device, the polymer concentration is usually less than 10 wt %. The polymer network formed in such a liquid crystal cell is either anisotropic and mimics the structure of the liquid crystal or is randomly aligned. Because of the relatively low polymer content, the size of the liquid crystal domains are relatively large (>$\lambda$), and therefore, the switching times are not short enough to use in fast switching devices. Higher polymer content produces more dense polymer networks that result in significant light scattering in the cells.

Based upon the foregoing, it is evident that there is still a need in the art for a liquid crystal device that has improved switching times, that can provide maximum phase retardation and still provide minimal scattering of light in the various modes.

SUMMARY OF THE INVENTION

It is, therefore, an object of the present invention to provide a liquid crystal light modulating cell, comprising a pair of spaced apart substrates; at least one electrode disposed on each surface of said substrate and facing one another; a light modulating material disposed between the substrates, the light modulating material comprising a liquid crystal material and a polymer material that forms domains interspersed in the liquid crystal material, the polymer material orienting the liquid crystal material in an initial state of uniformly aligned liquid crystal areas; and a power supply connected to the electrodes to apply an electric field to the liquid crystal material to re-orient at least some of the liquid crystal areas to generate a corresponding phase shift of any light impinging the cell.

It is another object of the present invention is a method for making a phase retardation plate, comprising; mixing a solution of liquid crystal material and a photocurable monomer; pre phase-separating the solution with ultraviolet irradiation of the solution to form a film with an interpenetrating structure of polymer chains and interconnected liquid crystal domains having their liquid crystal directors randomly oriented; and applying a force to the film to orient the liquid crystal directors in a single direction and cause the film to appear substantially transparent.

BRIEF DESCRIPTION OF DRAWINGS

For a complete understanding of the objects, techniques and structure of the invention, reference should be made to the following detailed description and accompanying drawings, wherein:

FIGS. 1A–C are schematic drawings of a liquid crystal cell according to the present invention, wherein FIG. 1A is a schematic representation of the cell after polymerization, wherein FIG. 1B is a schematic representation of the cell after a force is applied thereto; and wherein FIG. 1C is a schematic representation of the cell after application of an electric field;

FIGS. 11A–C are representations of microphotographs of an exemplary cell made in accordance with the teachings of the present invention, wherein FIG. 11A is an initial state, wherein FIG. 11B is the exemplary cell with an electric field applied to all of the electrodes, and wherein FIG. 11C is the exemplary cell with an electric field applied to every other electrode of the cell.

DETAILED DESCRIPTION OF THE INVENTION

Definitions

Figure 1A:
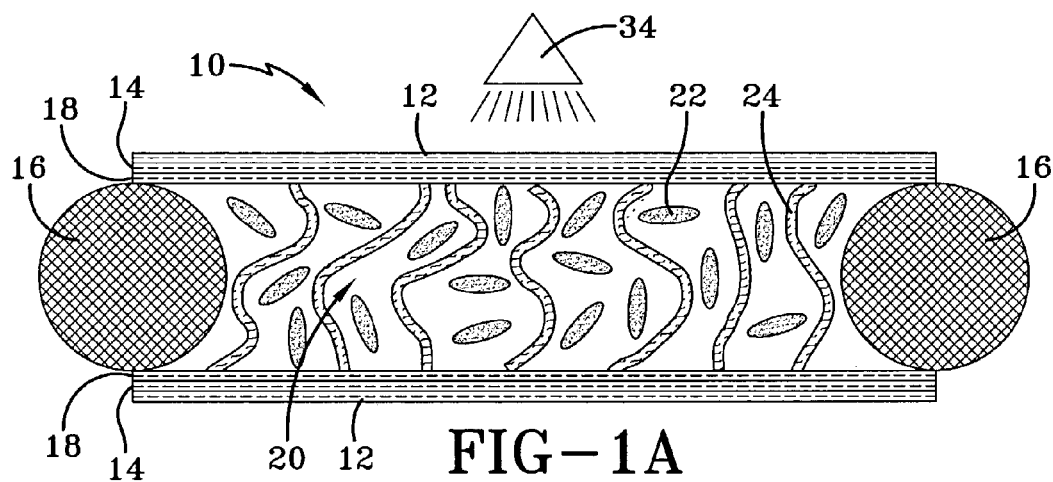

Unless otherwise indicated, the following terms used in this document have the following meanings:

Mesogen refers to rigid rodlike or dislike molecules which are components of liquid crystalline materials.

Liquid crystal refers to a thermodynamic stable phase characterized by anisotropy of properties without the existence of a three-dimensional crystal lattice, generally lying in the temperature range between the solid and isotropic liquid phase, hence the term mesophase. The preferable orientation of the liquid crystal molecules is denoted as a director.

Spatial Light Modulator refers to a device that modulates light intensity according to the prescribed spatial pattern on the device.

Retardation Plate refers to a transparent plate of a birefringent material, such as a liquid crystal or quartz, cut parallel to the optic axis. Light falling on the plate at 90° to the optic axis is split into an ordinary ray and an extraordinary ray, which travels through the plate at different speeds. The phase difference between the exiting ordinary and extraordinary rays depends on the birefringence and thickness of the plate.

Homeotropic refers to a liquid crystal state where the director of a liquid crystal molecule is aligned perpendicular to the surface of the substrate.

Birefringence refers to the property of uniaxial anisotropic materials in which light propagates at different velocities, depending on the light's direction of polarization relative to the optic axis. A wave with polarization perpendicular to the optic axis will exhibit an "ordinary" index of refraction, $n_o$ (this is often referred to as the ordinary ray). In contrast, a wave with polarization parallel to the optic axis exhibits an "extraordinary" index, $n_e$ (the extraordinary ray). The ordinary index, $n_o$, is isotropic with respect to direction of propagation while the extraordinary, $n_e$, varies depending on the direction of propagation with a maximum value for light traveling perpendicular to the optic axis and, of course, polarized parallel to it. The difference $\Delta n = n_e - n_o$ is also referred to as the birefringence or the optical anisotropy.

Polarizer refers to a device, which in the transmission of electro-magnetic radiation, confines the vibration of the electric and magnetic field vectors to one plane. Optical switch refers to a switch that enables signals in optical fibers or integrated optical circuits (IOCs) to be selectively switched from one circuit to another. An optical switch may operate by (a) mechanical means such as physically shifting an optical fiber to drive one or more alternative fibers, or (b) electro-optic effects, magneto-optic effects, or other methods. Slow optical switches, such as those using moving fibers, may be used for alternate routing of an optical transmission path, e.g., routing around a fault. Fast optical switches, such as those using electro-optic or magneto-optic effects, may be used to perform logic operations.

PDLC refers to polymer dispersed liquid crystals

PSLC refers to polymer stabilized liquid crystals

Figure 1B:
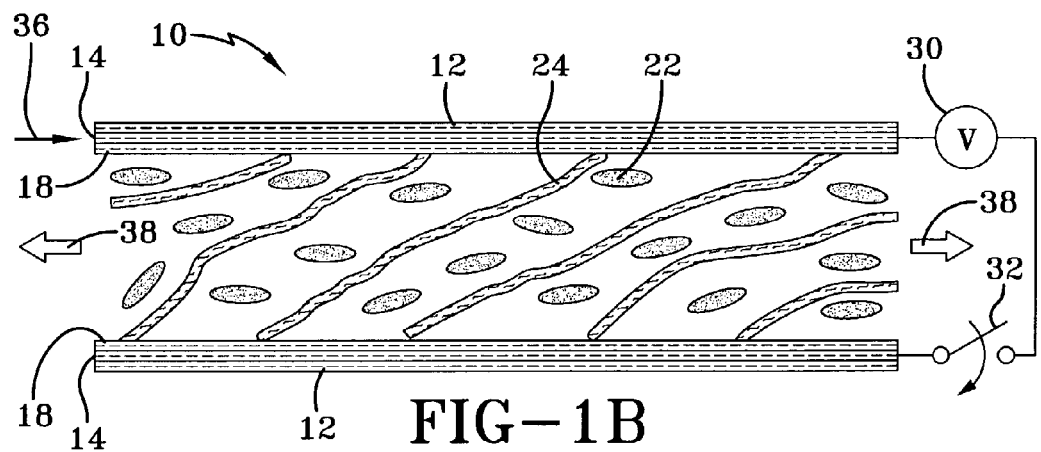
Figure 1C:
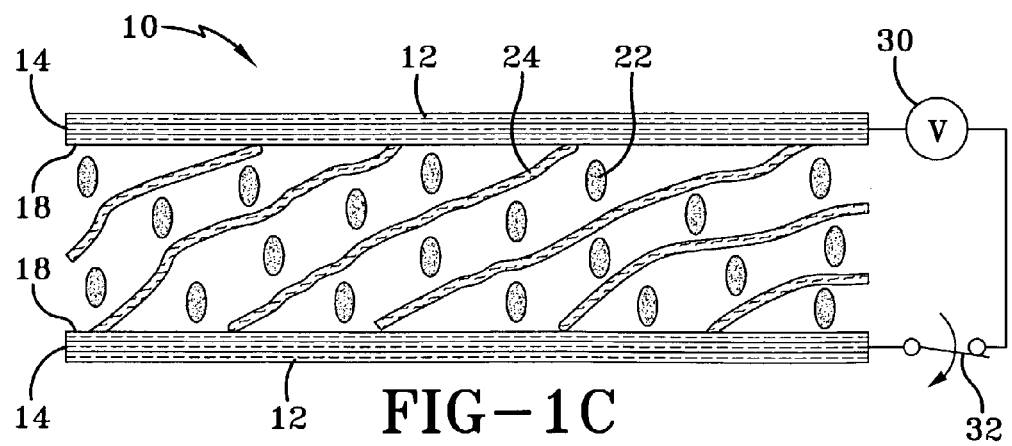

Referring now to the drawings and in particular to FIGS. 1A–C it can be seen that a liquid crystal cell according to the present invention is designated generally by the numeral 10. In FIG. 1A, the cell 10 includes a pair of opposed substrates 12 wherein at least one of the substrates 12 is made from a transparent material such as glass or plastic and wherein the other substrate is either transparent or reflective such as provided by an aluminum substrate. Each facing surface of the substrates 12 has at least one electrode 14 disposed thereon. Of course an aluminum substrate may itself function as the electrode. As will be described in further detail, the electrodes 14 may cover the entire surface of the substrate or the substrate may have a plurality of electrodes disposed thereon in a parallel fashion. In other words, the electrodes may be configured on one substrate in a plurality of rows which have periodic spacing therebetween. If desired, the other substrate may also be provided with a plurality of electrodes configured in columns so that the intersecting electrodes on the two substrates of the cell may form a plurality of pixels. It will be appreciated that the end use of this invention will likely dictate the configuration of the electrodes with respect to the substrates. In any event, the substrates are spaced apart from one another by a plurality of spherical spacers 16 or equivalent rods or other means known in the art for maintaining a uniform space between the substrates. If desired, but not required, alignment layers 18 may be disposed on the electrodes so as to assist in the alignment of the liquid crystal material to be used. Alternatively, other insulating layers may be applied to the alignment layers if desired. As will become apparent, no specialized surface treatments that produce a preferred liquid crystal alignment are required to practice this invention. In other words, the electrodes may have direct contact with the material 20.

Filled in between the substrates 12 is a light modulating material 20 which comprises a liquid crystal material and a monomer/polymer material. The light modulating material 20, once filled between the substrates 12 is exposed to a predetermined wavelength of ultraviolet light from a light source 34 so as to form an interpenetrating structure of polymer chains 24 which form interconnected liquid crystal domains or areas 22.

A voltage supply and appropriate control electronics system 30 is connected between the electrodes 14 for applying an electric field to the light modulating material 20. A switch 32 may be interposed between one of the electrodes and the power supply 30. As noted previously, a UV light source 34 is utilized for polymerizing the monomer so as to form the interpenetrating polymer chains 24 which extend between the surfaces of the substrates 12. In a preferred embodiment, the material 20 is prepared in solution form and pre-separated with ultraviolet irradiation at an elevated temperature, such as above the nematic-isotropy transition temperature of the liquid crystal material. Afterwards, the material 20 is cooled to room temperature while still irradiating with ultraviolet light to form a film 26 with the interpenetrating structure of polymer chains 24 and interconnecting liquid crystal areas 22 having their liquid crystal directors randomly oriented.

In order to provide uniform orientation or alignment of the liquid crystal directors throughout the thickness of the film or cell 10 it has been determined that application of a force orients all the liquid crystal molecules in the direction of the force applied within the liquid crystal area. And the orientation is accomplished throughout the thickness of the cell. In one embodiment it has been found that by holding one of the substrates 12 in a fixed position and applying a displacement or shearing force 36 to the other substrate in a linear direction provides the necessary application of force. The amount of shearing has been found to correlate to the amount of phase shift for a light impinging upon the cell in the manner that will be discussed in further detail. Alternatively, the liquid crystal molecules can be oriented or aligned by stretching the film 10 in a linear direction. In other words, both ends of a film 10 could be grasped at opposite ends and pulled an appropriate amount by forces indicated by the numeral 38. It is envisioned that other applications of mechanical force to either the cell 10 or the film 26 that is formed between the substrates will result in the desired alignment properties.

Figure 4:
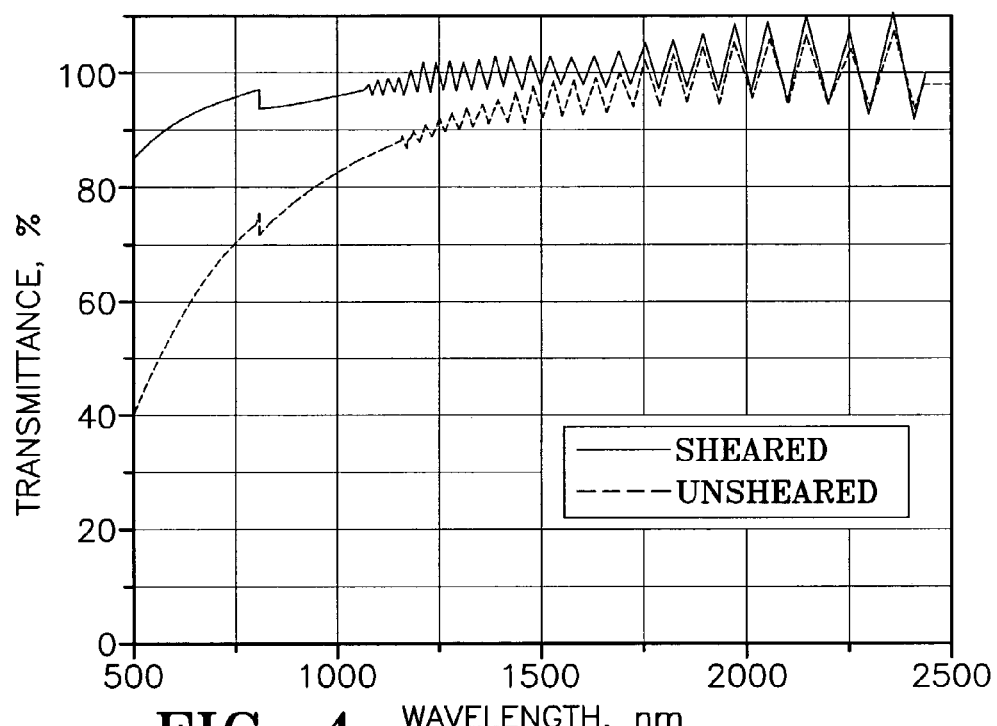
FIG. 4 is a graphical represenation of the transmittance spectra of an exemplary film in sheared and unsheared states.
Figure 5:
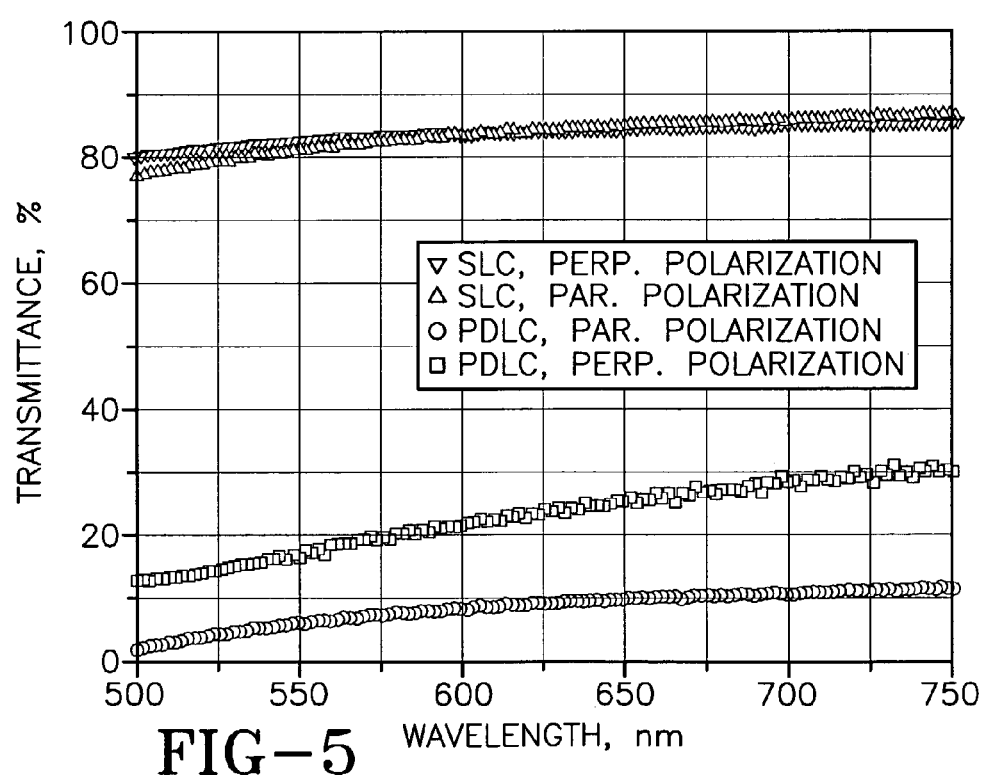
FIG. 5 is a graphical represenation of transmittance versus the wavelength of light comparing an exemplary liquid crystal cell according to the present invention to prior art polymer dispersed liquid crystal cells.

As best seen in FIG. 1C, application of an electric field causes the liquid crystal material to align in a homeotropic texture. In contrast to traditional PDLC films, the cell 10, also referred to as Stressed Liquid Crystals (SLCs), has vastly improved transmittance properties after shearing as seen FIG. 5. SLCs scatter the light slightly after a preparation of the cell. But even a slight shearing makes cell 10 optically transparent, like window glass as seen in FIG. 4. Accordingly, application of an electric field does not change the optical appearance of the SLCs film, but changes the phase retardation of the film wherein the liquid crystal molecules tend to orient along the electric field. Although not visible to the naked eye, the changes in the orientation can be seen if the cell is placed between crossed polarizers. As shown in FIG. 1C, application of an electric field by closure of the switch 32 or by use of the electronics system 30 drives the liquid crystal directors into the homeotropic texture, providing the change of the phase retardation. Of course, the final optical appearance of the cell depends on the polarization of the incoming light and the configuration of any polarizers on one or both sides of the cell 10.

For high diffraction efficiency, a high concentration of nematic liquid crystal in the film layer is required. Also, fast gelation of the curing monomer results in small liquid crystal domains. For this embodiment a commercially available Norland resin (NOA 65) was used. Of course, similar polymer resins could be used to practice this invention, such as SAM 114 (Merck), MXM 035 (Merck), PN 393 (Merck), or reactive mesogenes like RM 1, RM 82, RM 84 (all made by Merck.) The elastic nature of the selected polymer is favorable for lowering the surface interaction with the nematic material. The curing rate of the Norland polymer is high enough to form the necessary liquid crystal morphology.

The choice of the liquid crystal plays a very important role in the electro-optical performance of the birefringent cell 10. High $\Delta n$ and $\Delta \epsilon$ are both important parameters in the choice of liquid crystal material as they result in higher birefringence change and lower applied switching fields. The following materials are commercially available from Merck. The E and BL type materials, are composed of mixtures of cyanobiphenyls and higher aromatic homologues. Their $\Delta n$ varies from 0.21 to 0.28 and $\Delta \epsilon$ varies from about 13 to 18. The main advantage of the cyanobiphenyl liquid crystals is their compatibility with Norland-based monomers. Merck also supplies the so called TL compounds that are composed of mixtures of chloro and fluoro substituted mesogens. The TL series are characterized by high environmental stability, high resistivity, high voltage holding ratio, and low switching fields.

The N-I transition temperature of the liquid crystals is also important in the choice of the liquid crystal. This is important for devices that may operate at higher temperatures. Liquid crystal material E7 has a N-1 transition around 59° C., the LC material BL series clears in the range of 70 to 90° C., and the available TL series material clears between 77 and 91° C.

A cell made according to the present invention used Norland optical adhesive NOA65 as a photopolymerizable monomer mixed with the liquid crystal E7. In this example, the specific concentrations of the material 20 are about 14 wt. % of the polymer and about 86 wt % of the liquid crystal.

It is believed that the concentration of monomer/polymer in the mixture 20 can range between about 10 to 22%. The material 20 was sandwiched between glass substrates 12 which are coated with indium tin oxide (ITO) electrodes. In order to check the performance of the films, two kinds of cells were prepared. In the first one, the electrodes 14 were homogeneous on the entire area of the substrate. In the second, the electrodes 14 on the glass substrates 12 were etched to give a series of parallel electrodes (width of the electrodes was 120 μm and the distance between the electrodes was 30 μm). A reflecting aluminum plate was used as the second substrate 12 for both types of cells. The gap between these substrates was controlled using 22 μm plastic sphere spacers 16. The cells were capillary filled and maintained at uniform temperatures (100° C.) during UV exposure (the intensity of the UV light was ~30 mW/cm$^2$).

Figure 2:
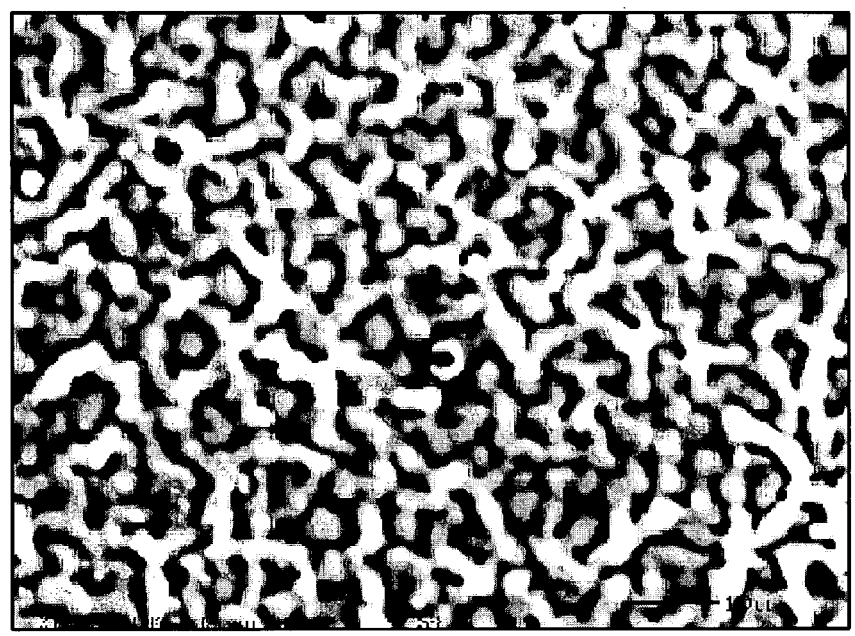
FIG. 2 is a scanning electron microscope (SEM) image of the film made according to the present invention, wherein the scale is 10 μm.
Figure 3:
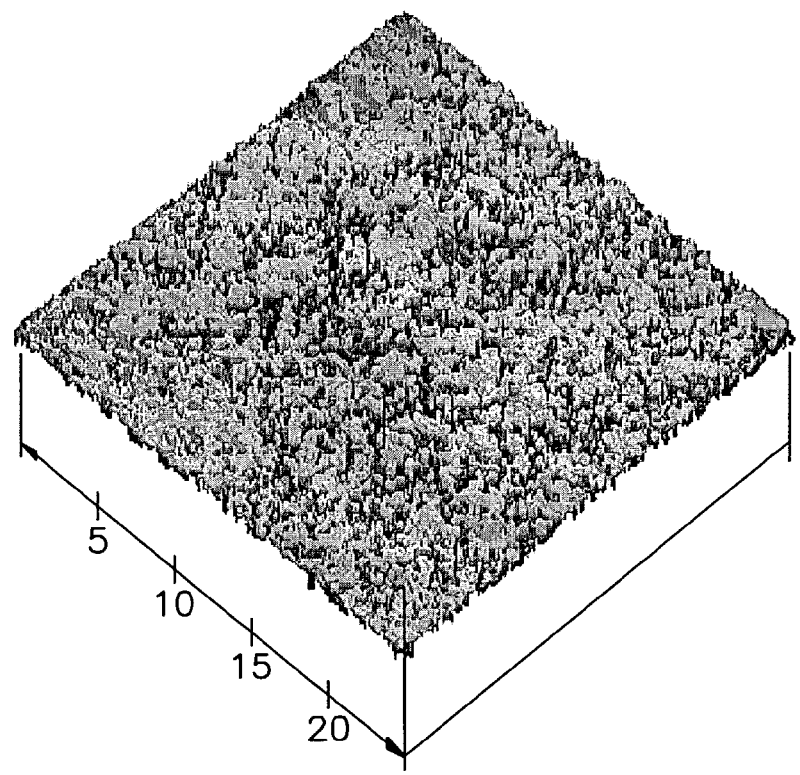
FIG. 3 is an atomic force microscopy (AFM) image of the film in a phase mode, which shows the distribution of the polymer and the liquid crystal area in the cell and confirms the chaotic distribution of the polymer chains in the bulk of the cell.

As can best be seen in FIG. 2, preparation of the exemplary cell resulted in the original structure of interconnected channels/domains of the liquid crystal domains between the rigid polymer chains which extend from the top surface of the bottom substrate to the lower surface of the top substrate. A microscopy image of the film in a phase mode is shown in FIG. 3 and reveals the distribution of the polymer and the liquid crystal in the cell 10. In this case there is a random orientation of the liquid crystal molecules within the domains or areas and the film significantly scatterslight in the spectral region below 2 μm. However, application of a suitable external force such as 36 or 38 to the cell 10 causes alignment of the director in the different domains along one direction—the direction of the force. As discussed, this force may be in the form of shearing, stretching or the like. The scattering of the light impinging on the film decreases as the force deformation increases as evidenced in FIGS. 4 and 5.

As seen in FIG. 4, the transmittance of a 20-μm thick film—made according to the parameters identified above—after application of a shearing force displacement of about 10 μm is shown. Additional shearing of the cell futher reduced the light scattering and therefore increased the transparency. A special apparatus was created in order to apply the force 36 and shear the film where one substrate was fixed on a support while the other was moved. The distance of shearing was controlled with a micro-screw which has an accuracy higher than 1 μm. As will be discussed in further detail, by adjusting the degree of shearing one can control the total phase shift in the film 26.

Measurements

Two kinds of electro-optical performance measurements were made. To demonstrate high speed, high contrast, operating voltage and shift of the phase retardation, the cell 10 with the continuous electrodes was placed between two crossed polarizers. The optical axis of the cell was at 45 degrees to the polarization direction of the polarizers. The intensity of a He-Ne laser beam passing normally through the cell was then measured by a photodetector. Because the liquid crystal directors 22 were oriented unidirectionally the following standard consideration for a uniaxial crystal can be used.

When a plane wave is incident normally to a uniaxial liquid crystal layer sandwiched between two polarizers, the outgoing beam experiences a phase retardation δ due to the different propagation velocities of the extraordinary and ordinary rays inside the LC:

$$\delta = \frac{2\pi d}{\lambda}(n_e - n_o) = 2\pi\Delta nd/\lambda \tag{1}$$

In Equation (1) d is the cell gap, Δn is the birefringence and λ is the wavelength. When a homogeneous cell is sandwiched between two polarizers, the normalized light transmittance is governed by the following equation:

$$T = \cos^2\chi - \sin 2\beta \cdot \sin 2(\beta-\chi) \cdot \sin^2(\delta/2) \tag{2}$$

Here χ is the angle between the polarizer and the analyzer, β is the angle between the polarizer and the LC director, and δ=2πdΔn/λ is the phase retardation. For the simplest case that β=45° and the two polarizers are either parallel (χ=0) or crossed (χ=90), the normalized light transmittance are simplified to:

$$T_{par} = \cos^2(\delta/2) \tag{3}$$

and $$T_{perp} = \sin^2(\delta/2) \tag{4}$$

For a homogeneous cell, the effective phase retardation depends on the wavelength and the applied voltage. The birefringence of the cell slightly decreases as the wavelength increases. When the voltage applied by the supply 30 exceeds the Freedericksz threshold voltage, the LC directors are reoriented along the electric field direction. As a result, the effective birefringence and, in turn, the phase retardation are decreased. Thus one can electrically control the phase retardation of the film. Moreover, the amount of phase retardation change can be controlled by varying the amount of the applied field.

Alternative cells can be constructed utilizing different liquid crystal materials. After manufacture of the cell 10, or the film 26 captured between the two substrates, a solvent can be applied which effectively removes the liquid crystal material leaving behind the polymer chains. A new liquid crystal material may then be filled into these previously aligned polymer chains. The optical effects provided by the new liquid crystal materials along with the aligned polymer chains are believed to speed up and improve the switching or relaxation times of the re-inserted materials. Nematic, chiral nematic, smectic, ferroelectric and dual frequency materials may be used as the original liquid crystal material or as the re-inserted material.

Figure 6:
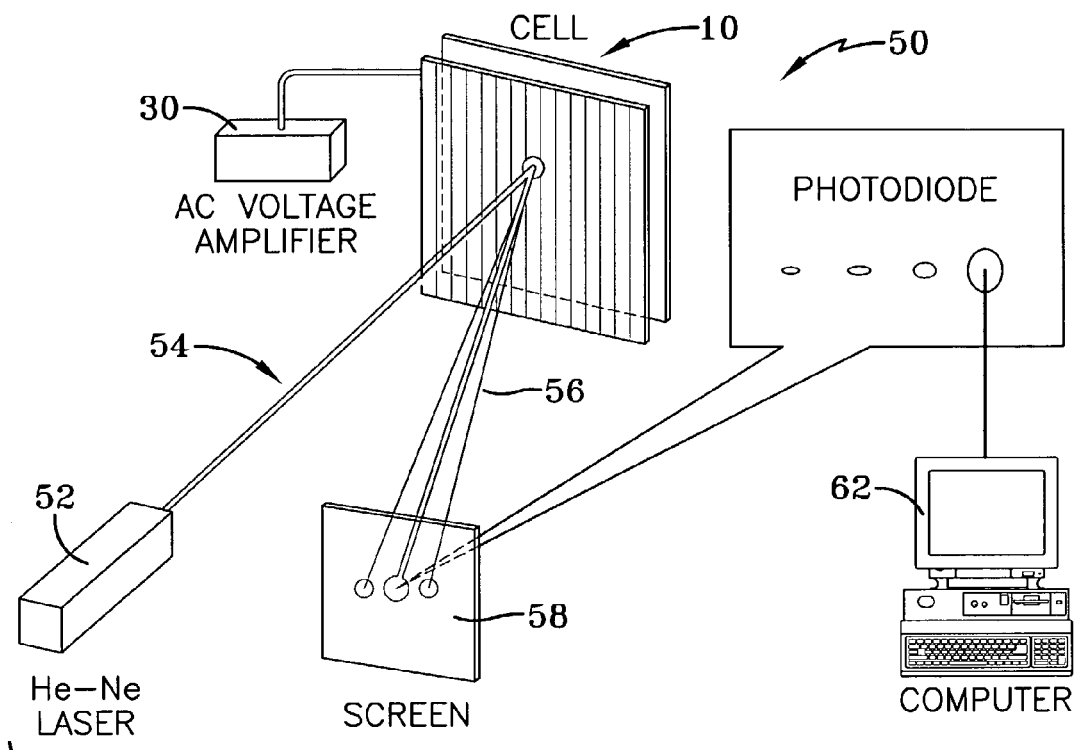
FIG. 6 is a schematic representation of a test system for the estimation of the diffraction performance of the film.

The electro-optic response of the cell with the striped electrodes was measured by the system 60 shown in FIG. 6. A laser 52 generates a polarized He-Ne laser light that passes through the striped ITO-glass substrate, reflected from the rear aluminum substrate, and was detected with the high-speed photodiode 58. When a voltage is applied across the cell those areas of the film above the ITO electrodes switch from their initial orientation to the homeotropic texture (see FIG. 1C), while the other areas remain unchanged. This produces a refractive index phase grating diffraction. The light intensity of the first diffraction peak or the central diffraction maximum produced by this grating as a function of the applied voltage was then measured by the computer 62.

Figure 7:
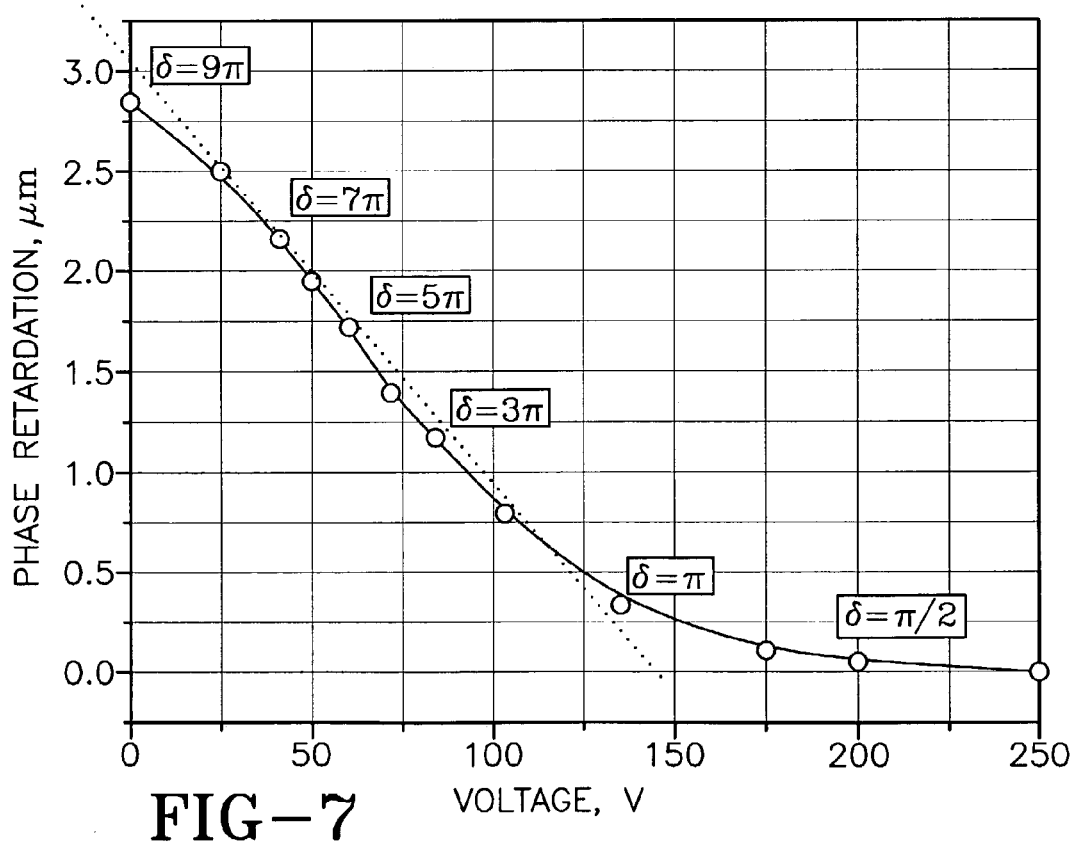
FIG. 7 is a graphical representation of the dependence of the phase retardation of the cell as a function of an applied electric field.
Figure 8:
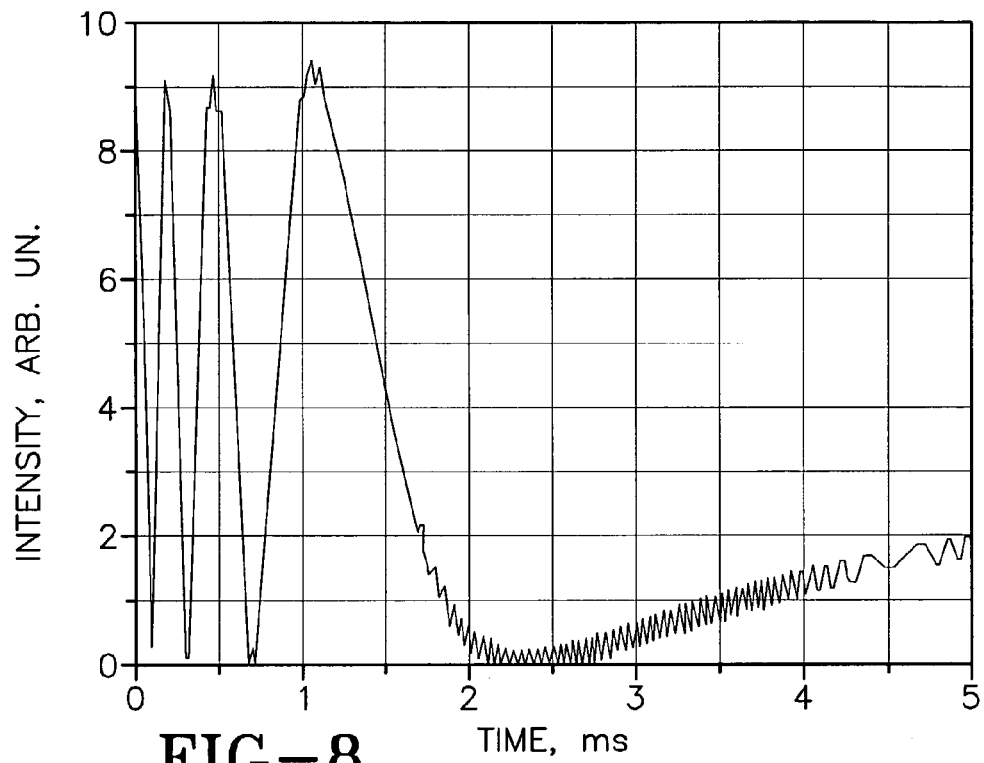
FIG. 8 is a graphical representation of the dynamics of the liquid crystal relaxation after removing an applied voltage to the cell.

The dependence of the phase retardation as a function of an applied voltage to an exemplary cell is shown in FIG. 7. Operation in the range from 25 to 135 V led to a linear shift in the birefringence of ~2 µm. The dynamics of the cell relaxation after removing the applied voltage (135 V) is shown in FIG. 8. The phase retardation shift of ~2 µm occurred within 1 ms. The well defined minima and maxima in the variation of the transmittance point to the high optical quality—no light scattering—of the birefringent film.

Figure 9:
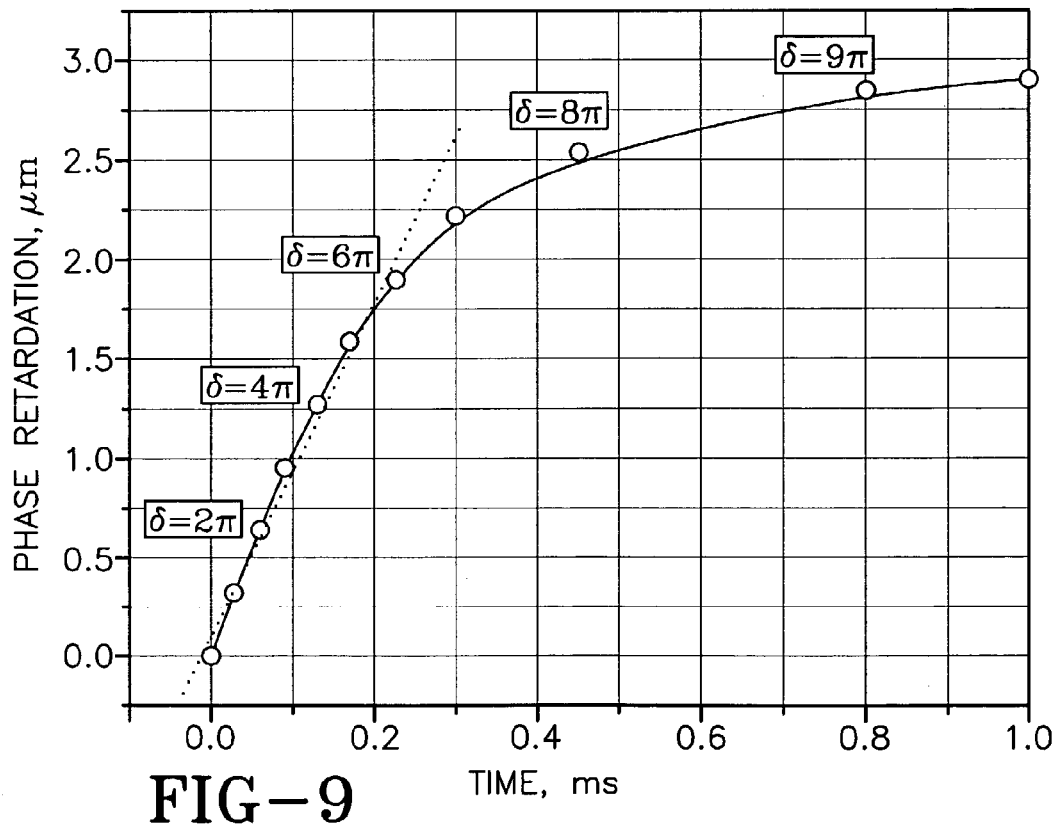
FIG. 9 is a graphical representation of the dynamics of the liquid crystal relaxation of the first diffraction maxima measured by the test system.
Figure 10:
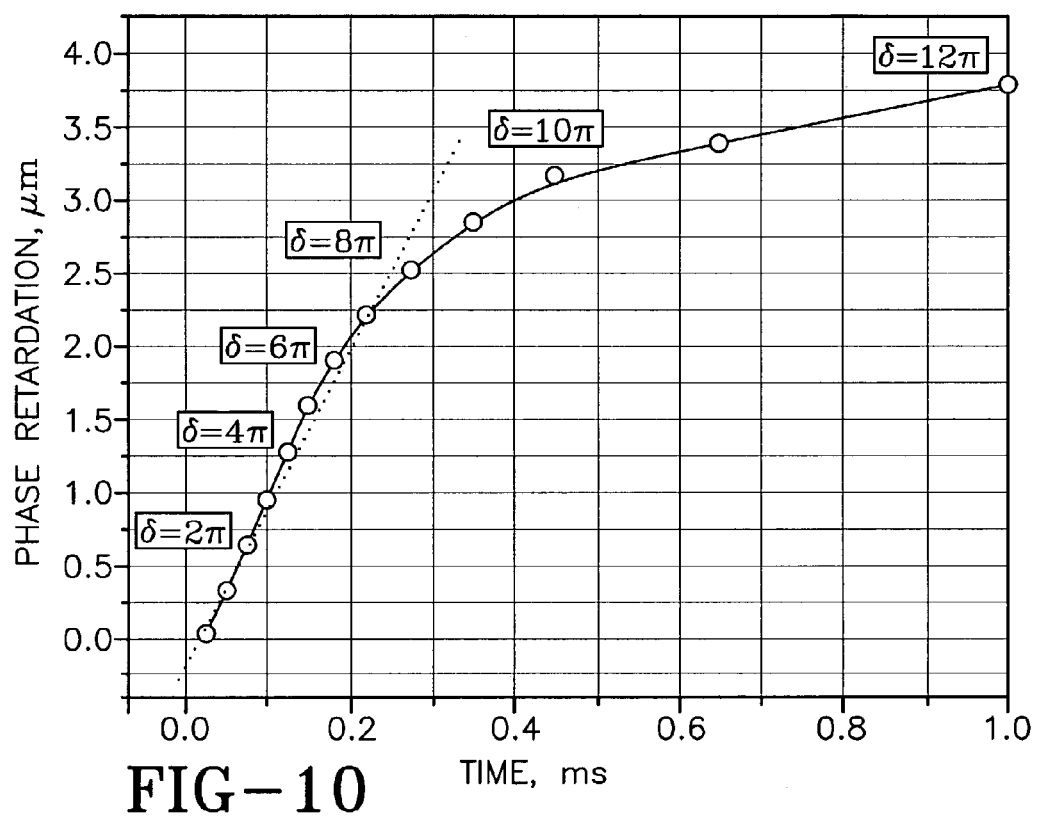
FIG. 10 is another graphical representation of the dynamics of the liquid crystal diffraction relaxation of the first diffraction maxima measured by the test system.
Figure 11A:
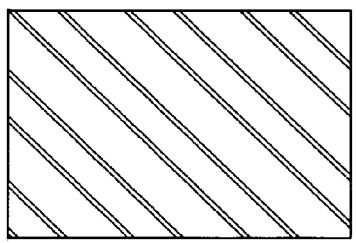
Figure 11B:
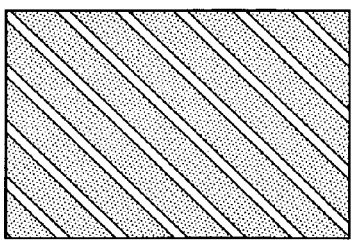
Figure 11C:
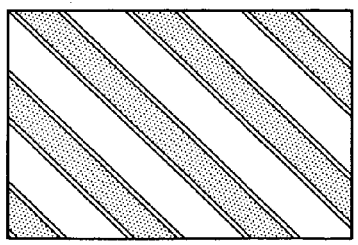

FIGS. 9 and 10 show the dynamics of the relaxation of the first diffraction maxima measured by the system shown in FIG. 6. Removing 100 V (FIG. 9) and 150 V (FIG. 10) led to the phase shift of ~3 µm and 4 µm respectively, both of which occurred within the time of 1 ms. FIGS. 11A–C are representations of microphotographs of the exemplary cell between crossed polarizers. In particular, FIG. 11A shows an initial state, FIG. 11B shows an electric field applied to each striped electrode; and FIG. 11C shows an electric field applied to every other electrode.

As can be seen from FIGS. 2 and 3, the size of the liquid crystal domains in the film is rather large (about 2–3 µm). This is confirmed by the relatively low driving voltage necessary to operate the cell 10. On the other hand, the interpenetrating polymer structure 24 maintains the necessary distribution of the domain boundaries and results in a fast operation of the birefringent film.

Based upon the foregoing, it is readily apparent that a new class of liquid crystal devices have been developed that have a range of concentration of polymer intermediate between PDLC and the PSLC, that is between 10 and 22% and preferably between 14 and 18 wt %. Using special preparation conditions an interpenetrating structure of polymer chains and interconnected liquid crystal areas was provided. Surprisingly, the intrinsic scattering of such films decreased drastically with application of a force deformation. Moreover, shearing or stretching of such a film or device greatly reduces the relaxation time of the material. Accordingly, a new light modulating material consisting of unidirectionally oriented micro-domains of liquid crystal separated with polymer chains has been developed.

Moreover, the advantages of the cell and its method of preparation are readily apparent. Particularly, it has been determined that a cell made according to the foregoing methodologies is capable of producing desired phase shifts in several hundred microseconds which is believed to be orders of magnitude faster than any previously known nematic liquid crystal type shutter. Using the foregoing methodologies various configurations of shutters with various electrode configurations can be constructed. Accordingly, diffraction gratings using the films have a diffraction efficiency of more than 95 percent and these materials can be used to manufacture high-resolution spatial light modulators capable of continuous phase modulations with sub-millisecond frame rates. A film of the material only 20 µm thick is capable of producing a 2 µm shift of phase retardation in several hundred microseconds. And it is believed that large cells can be made with corresponding benefits. Moreover, these cells can be used in conjunction with amplitude modulation type cells for a desired effect. Moreover, the present invention is advantageous in that it is simple to manufacture in a one-step production process which is amenable to mass production and is cost effective. The present invention is further advantageous in that fast switching times occur with minimal light scattering of the cell so as to improve light throughput efficiency.

Thus, it can be seen that the objects of the invention have been satisfied by the structure and its method of manufacture and use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

The invention claimed is:

1. A light modulating cell, comprising:
   at least two spaced apart substrates;
   at least one electrode provided with each substrate to apply an electrical field therebetween another;
   a light modulating material disposed between said substrates, said light modulating material comprising
      a larger proportion of liquid crystal material; and
      a smaller proportion of polymeric material that forms domains interspersed in said larger proportion of liquid crystal material, to form interconnected liquid crystal areas, wherein the liquid crystal material is substantially uniformly aligned in an initial state in the interconnected liquid crystal areas; and
   a power supply connected to said electrodes to selectively apply an electric field to said liquid crystal material to selectively re-orient at least some of said liquid crystal areas to generate a predetermined phase shift of any light impinging the cell.

2. The cell according to claim 1, wherein application of said electric field causes at least an amount of said liquid crystal material to exhibit a homeotropic texture.

3. The cell according to claim 1, wherein said polymer material comprises about 10% weight to about 22% weight of said light modulating material.

4. The cell according to claim 1, wherein no specialized surface treatments are applied to said electrodes.

5. The cell according to claim 1, wherein an amount of said phase shift depends at least upon a magnitude of said electric field.

6. The cell according to claim 1, wherein initial alignment of the liquid crystal material is produced by application of a force to the material, and the amount of said phase shift depends at least upon an amount of displacement of said liquid crystal directors with respect to said substrates obtained by applying the force to the light modulating material.

7. The cell according to claim 6, wherein substantially all of said liquid crystal areas are oriented along the direction of the force.

8. The cell according to claim 1, wherein said substrates are selected to be transparent or reflective.

9. The cell according to claim 1, wherein the light modulating material is substantially transparent.

10. The cell according to claim 1, wherein light modulating material is substantially homogenous.

11. The cell according to claim 1, wherein the light modulating material produces phase retardation of light impinging thereon, with the amount of phase retardation controllable by the applied voltage from said electrodes.

12. The cell according to claim 1, wherein in the light modulating material is capable of producing a phase shift of up to about 3.75 µm in less than 1.0 millisecond.

13. The cell according to claim 12, wherein the light modulating material does not substantially scatter visible light.

14. The cell according to claim 1, wherein upon the application of an electric field to generate the phase shift, the transmittance properties of the material remain substantially the same.

15. The cell according to claim 1, wherein the transmittance properties of the light modulating material do not substantially vary based on the polarization of light impinging thereon.

16. The cell according to claim 1, wherein the phase retardation of the light modulating material is substantially linear.

17. The cell according to claim 1, wherein the light modulating material is formed into a film, and the thickness of the film can be varied to alter the phase shift characteristics thereof.

* * * * *